United States Patent [19]
Fontana, Jr. et al.

[11] Patent Number: 5,798,890
[45] Date of Patent: Aug. 25, 1998

[54] DISK DRIVE WITH IDENTICAL THREE-ELEMENT, SIDE-BY-SIDE HEADS ON OPPOSITE DISK SURFACES

[75] Inventors: Robert Edward Fontana, Jr., San Jose; Steven Robert Hetzler, Sunnyvale; Hugo Alberto Emilio Santini; Mason Lamar Williams, both of San Jose, all of Calif.

[73] Assignee: International Business Machines Corporation, Armonk, N.Y.

[21] Appl. No.: 811,490

[22] Filed: Mar. 5, 1997

[51] Int. Cl.$^6$ .............................. G11B 5/60; G11B 21/21
[52] U.S. Cl. ............................................................ 360/103
[58] Field of Search ..................................... 360/103, 113

[56] References Cited

U.S. PATENT DOCUMENTS

| | | | |
|---|---|---|---|
| 4,648,087 | 3/1987 | Scranton et al. | 360/103 |
| 4,729,048 | 3/1988 | Imakoshi et al. | 360/103 |
| 4,823,205 | 4/1989 | Hannon et al. | 360/103 |
| 4,901,185 | 2/1990 | Kubo et al. | 360/104 |
| 5,073,833 | 12/1991 | Best et al. | 360/77.05 |
| 5,202,803 | 4/1993 | Albrecht et al. | 360/97.02 |
| 5,212,611 | 5/1993 | Dee | 360/113 |
| 5,229,901 | 7/1993 | Mallary | 360/104 |
| 5,444,589 | 8/1995 | Hu et al. | 360/113 |

OTHER PUBLICATIONS

M. Barlow et al., "Thin Film Magnetic Head Assembly", *IBM Technical Disclosure Bulletin,* vol. 24, No. 4, Sep. 1981, pp. 1912–1913.

P. T. Chang et al., "Design and Performance of Dual–element Side–by–Side Heads", *IEEE Transactions on Magnetics,* vol. MAG–23, No. 5, Sep. 1987, pp. 2934–2936.

M. A. Church et al., "Thin Film Head Assembly with Side–by–Side Elements", *IBM Technical Disclosure Bulletin,* vol. 24, No. 4, Sep. 1981, pp. 1910–1911.

S. K. Decker et al., "Combined Servo and Data Head on Common Slider", *IBM Technical Disclosure Bulletin,* vol. 24, No. 10, Mar. 1982, p. 4914.

D. M. Jones, "Quadrature Servo Generation with Side–by–Side Data Heads", *IBM Technical Disclosure Bulletin,* vol. 26, No. 2, Jul. 1983, pp. 850–852.

W. McCormick, "Multielement Servoing Head", *IBM Technical Disclosure Bulletin,* vol. 17, No. 4, Sep. 1974, pp. 979–980.

L. T. Romankiw et al., "Design of Separately Optimized Thin Film Read/Write Magnetic Recording Heads", *IBM Technical Disclosure Bulletin,* vol. 23, No. 5, Oct. 1980, pp. 2148–2149.

*Primary Examiner*—Robert S. Tupper
*Attorney, Agent, or Firm*—Thomas R. Berthold

[57] ABSTRACT

A magnetic recording disk drive uses side-by-side read/write heads formed on head carriers that are substantially identical for both top and bottom disk surfaces. Thus, a common head carrier functions as a single manufacturable part usable for both top and bottom disk surfaces. The common head carrier has a trailing end with a pattern of components formed on it that includes three side-by-side transducers and sets of terminal pads. In the read/write/read side-by-side head arrangement, the first element is a center write element, such as an inductive coil, and the second and third elements are read elements, such as magnetoresistive read elements, that are generally equally spaced from the center write element. In common carriers to be used for the top disk surfaces, one of the read elements is electrically connected to the read/write channel of the disk drive, and in common carriers to be used for the bottom disk surfaces, the other read element on the common carrier is electrically connected to the read/write channel. The disk drive thus operates in cylinder mode with side-by-side heads using a common carrier for both top and bottom disk surfaces.

3 Claims, 5 Drawing Sheets

DISK DRIVE WITH IDENTICAL THREE-ELEMENT, SIDE-BY-SIDE HEADS ON OPPOSITE DISK SURFACES

TECHNICAL FIELD

This invention relates in general to magnetic recording disk drives, and more particularly to magnetic recording disk drives that use side-by-side read/write heads.

BACKGROUND OF THE INVENTION

Disk drives, also called disk files, are information storage devices that use a rotatable disk with concentric data tracks containing the information, a head for reading and/or writing data onto the various tracks, and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator, and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a suspension that connects the slider to the actuator. The slider flies over the disk surface as a consequence of a balance of the spring force from the suspension and the air pressure generated by the velocity of the rotating disk. In a variation of the conventional air bearing, a combined air and liquid bearing supports the slider, which is in very close proximity or actual contact with a relatively thin lubricant film on the disk. Disk drives of this type are described in U.S. Pat. No. 4,901,185 assigned to Toshiba and U.S. Pat. No. 5,202,803 assigned to IBM.

The most common form of disk drive actuator is a rotary actuator that moves the head carriers in a nonlinear, generally arcuate path across the disk surfaces. Typically, there are two head carriers per disk, one for each of the "top" and "bottom" disk surfaces, that are attached to the actuator so that the carriers move in unison on the opposite surfaces of the disk. The conventional arrangement for reading and writing data is the well-known "cylinder mode". In this arrangement, continuous data is written by the top head writing to the top disk surface, followed immediately by the bottom head writing to the corresponding track in the same "cylinder" on the bottom disk surface. Cylinder mode operation allows reading and writing on a data track on one data surface, to be immediately followed by reading or writing on the corresponding data tracks (i.e., the data tracks in the same cylinder) on other data surfaces with little or no repositioning of the actuator. In disk drives that use noncylinder mode, there is no requirement that the heads on different disk surfaces be generally aligned with one another because data is typically written by writing first to one disk surface on adjacent tracks and then followed by writing to other disk surfaces on adjacent tracks.

Because the rotary actuator moves in an arcuate path, the sensing ends of the heads are not always aligned perpendicular to the data tracks, but are skewed relative to the tracks, the amount of skew varying with radial position. Recent disk drives use dual-element heads, i.e., an inductive coil element for writing and a magnetoresistive (MR) element for reading. One problem that arises with dual-element heads in rotary actuator disk drives with inherent skew is that because the two elements are spaced from one another in a direction perpendicular to the trailing end of the carrier, a rotary actuator is not able to maintain both elements in simultaneous alignment with the data tracks due to the inherent nonlinear path across the disk surface. To compensate for this, dual-element heads are typically fabricated with the read and write elements slightly offset from one another in a direction parallel to the trailing end of the carrier, the amount of offset being determined by the average skew of the heads. However, this solution is only optimal at one specific angular position of the rotary actuator and becomes unacceptable at high track densities where the data tracks are very closely spaced. An additional problem with dual-element heads in both rotary actuator disk drives and linear actuator disk drives is that because the elements are closely spaced on top of one another on the trailing end of the slider so that both elements can be aligned with the same data track, the magnetic field from the inductive write element can alter the magnetization state of the nearby MR read element.

Side-by-side, dual-element heads have been proposed to address these problems. In a side-by-side head, the write gap (i.e., the sensing end) of the inductive coil write element and the MR sensing film of the MR read element are located in the same plane on the trailing end of the slider but are spaced apart from one another in a direction parallel to the slider trailing end. In this design, the read and write elements are not simultaneously located over the same track so it is necessary for the actuator to move the slider if read and write operations are to take place sequentially on the same track. Side-by-side, dual-element heads are described in U.S. Pat. Nos. 5,229,901 assigned to DEC and U.S. Pat. No. 4,729,048 assigned to Sony. In these designs, a single write element and a single read element are located on the trailing end of the slider. However, since the read and write elements on the top data surface of the disk must be aligned with their counterparts on the bottom data surface of the disk if the disk drive is to operate in cylinder mode, the side-by-side head associated with the top surface of the disk must be the mirror image of the side-by-side head associated with the bottom surface of the disk. The result is that two different types of heads must be fabricated: one for the top surfaces of the disks and the other for the bottom surfaces of the disks. This complicates the head manufacturing process and disk drive assembly process.

An additional problem with both conventional dual-element heads and side-by-side, dual-element heads is that if either the read element or write element is determined to be bad after manufacturing, the entire head carrier is rejected.

What is needed is a slider with a side-by-side read/write head structure that can be manufactured at a higher yield and can function as a single common part for use on both top and bottom data surfaces, thereby resulting in a disk drive with identical side-by-side heads on all disk surfaces.

SUMMARY OF THE INVENTION

The invention is a magnetic recording disk drive that uses a common head carrier for both top and bottom disk surfaces. The common head carrier has a trailing end or surface with a pattern of components formed on it that includes three side-by-side transducers and sets of terminal pads. In the read/write/read side-by-side head arrangement, the first element is a center write element, such as an inductive coil, and the second and third elements are read elements, such as magnetoresistive read elements, that are generally equally spaced from the center write element. During the last stages of the fabrication process of the common head carrier, a lithographic mask is used to electrically connect one of the read elements with a selected set of terminal pads to personalize the carrier as either a top or bottom carrier. Alternatively, each read element is electrically connected to its own set of terminal pads during fabrication of the common head carrier, thereby eliminating the need for any personalization of the carrier, with the appropriate set of pads later being electrically connected to the wiring on the suspension at time of assembly. As a result, the disk drive can operate in cylinder mode with side-by-side heads using a common carrier for both top and bottom disk surfaces.

For a fuller understanding of the nature and advantages of the present invention, reference should be made to the following detailed description taken together with the accompanying drawings.

DETAILED DESCRIPTION OF THE INVENTION

Prior Art

Figure 1:
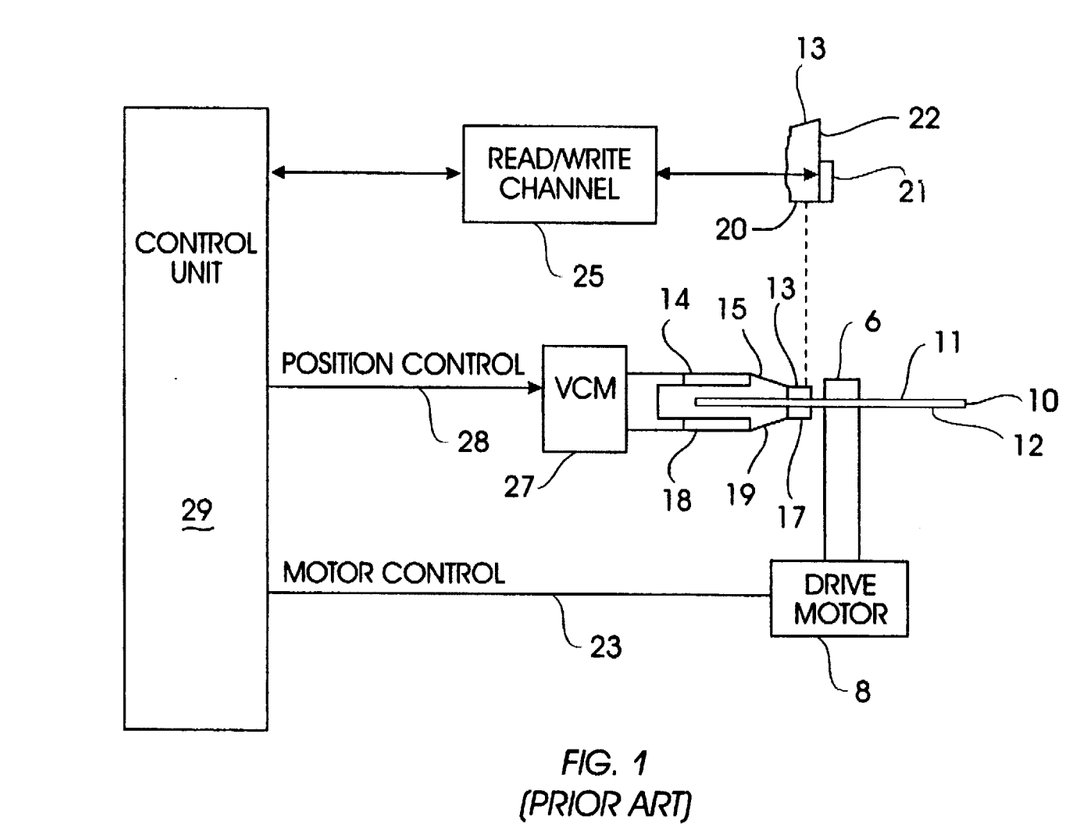
FIG. 1 is a block diagram of a prior art rotary actuator magnetic recording disk drive of the type capable of incorporating the present invention.

A conventional prior art disk drive of the type capable of incorporating the present invention is shown schematically in FIG. 1.

A magnetic recording disk 10, having "top" 11 and "bottom" 12 data surfaces, is supported on a spindle 6 and rotated by a disk drive motor 8. The magnetic recording media on each disk surface 11, 12 is in the form of an annular pattern of concentric data tracks (not shown).

A "top" head carrier 13 is positioned on the top surface 11 of disk 10. Carrier 13 is an air-bearing slider having an air-bearing surface or disk side 20 and a trailing end 22. The head carrier 13 supports a prior art dual-element read/write head 21 on its trailing end 22 for reading and writing data to the magnetic media on disk surface 11. The carrier 13 may be a three-rail, air-bearing slider of the type described in IBM's U.S. Pat. No. 4,894,740, with the head 21 being located on the trailing end of the center rail. Carrier 13 is attached to an actuator arm 14 by means of a suspension 15. The suspension 15 provides a slight spring force that biases the carrier 13 against the disk surface 11. A "bottom" carrier 17, also supporting a dual-element read/write head, is positioned on the bottom surface 12 of disk 10 and is attached to an actuator arm 18 by means of a suspension 19.

Actuator arms 14, 18 are attached to a rotary actuator 27. The actuator 27 is typically a voice coil motor (VCM) that comprises a coil movable within a fixed magnetic field, the direction and velocity of the coil movements being controlled by the motor current signals supplied by a control unit 29. As the disk 10 rotates, the rotary actuator 27 moves the carriers 13, 17 in a generally arcuate path radially in and out over their respective disk surfaces 11, 12 so that the read/write heads may access different portions of the disk surfaces where data is desired to be read or recorded.

In the conventional type of air-bearing disk drive, the rotation of the disk generates an air bearing between the carrier and its associated disk surface. The air bearing thus counterbalances the slight spring force of the suspension and supports the carrier off and slightly away from the disk surface by a small, substantially constant spacing during operation. However, the present invention to be described below is also applicable to other types of disk drives, such as contact or near-contact recording disk drives, wherein the head carrier is urged into contact with the disk during read and write operations.

The various components of the disk storage system are controlled in operation by control signals generated by control unit 29, such as access control signals and internal clock signals. Typically, the control unit 29 comprises logic control circuits, storage means, and a microprocessor, for example. The control unit 29 generates control signals to control various system operations, such as drive motor control signals on line 23 and track position and seek control signals on line 28. The control signals on line 28 provide the desired current profiles to optimally move and position the carriers 13, 17 to the desired data track on the respective disk surfaces 11, 12. Read and write signals are communicated to and from the read/write heads, such as head 21, by means of the read/write channel 25. Because the read/write head 21 is a dual-element head that includes an MR sensor for reading data, a current source (not shown) is used to apply a sense current to the MR sensor, and the read/write channel 25 includes MR signal amplification and detection circuitry. The suspensions 15, 19 have electrical wires or patterned conductors formed on them to provide electrical connection between the read/write channel 25 and the read/write heads on carriers 13, 17.

The above description of a typical prior art magnetic recording disk drive and the accompanying illustration of FIG. 1 is meant to be representative of many types of disk drives. For example, disk drives may contain a number of disks and rotary actuators, and each actuator may support a number of head carriers. Also, while a rotary actuator disk drive has been described, the present invention as described below is also applicable to disk drives that use linear actuators.

Figure 2:
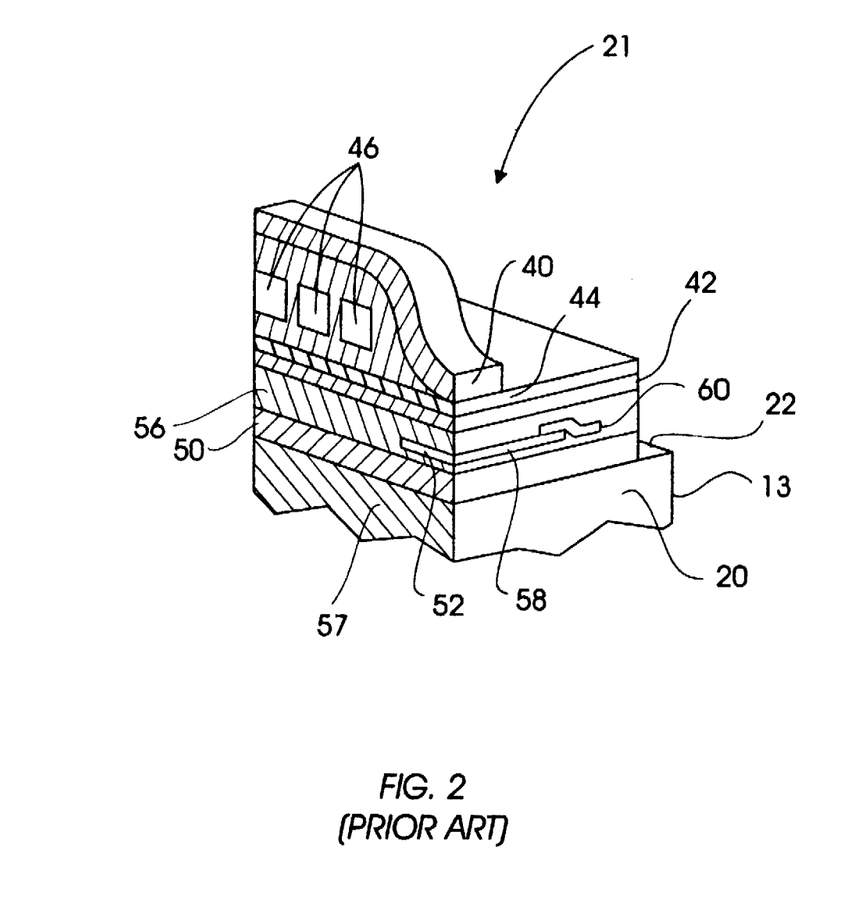
FIG. 2 is a sectional view of a prior art dual-element read/write magnetic recording head.

Referring now to FIG. 2, the prior art dual-element read/write head 21 formed on carrier 13 is shown in sectional view to illustrate the films making up the structure. The basic head comprises separate read and write structures formed over each other and sharing some common elements. The write transducer is a thin film inductive element comprising coil 46 and pole pieces 40, 42 that define a sensing end or write gap 44 on the disk side 20 of the carrier 13. The copper coil 46 is shown in sectional view between the pole pieces 40, 42. A first MR shield 50 is deposited on an oxide film grown on the trailing end 22 of carrier 13. The inductive pole piece 42 also serves as a second MR shield. MR shields 42, 50 are spaced apart from the MR sensor film 52, which is located in the middle of gap material 56 between the two shields. The MR sensor film 52 has a sensing end 58 on the disk side 20 of carrier 13. The MR sensor film 52 has electrical leads attached to its ends, such as lead 60 shown in FIG. 2. Since FIG. 2 is a sectional view showing the interior of the read/write head 21, the opposite half of MR sensor film 52 and its associated electrical lead are not shown. The electrical leads are connected to the current source to supply a sense current through MR sensor film 52 that is used to detect changes in resistance corresponding to changes in magnetic flux from the magnetic recording disk. The MR sensor film 52 and the coils 46 of the write transducer are electrically connected to the circuitry making up the read/write channel 25 (FIG. 1). As shown in FIG. 2, the sensing ends of the write and read transducers, i.e., write gap 44 and MR sensing end 58, intersect in the same plane 57 that is generally perpendicular to both trailing end 22 and disk side 20 of carrier 13. The sensing ends of the write and read transducers on the bottom carrier 17 (FIG. 1) also intersect in this same plane. This is the conventional arrangement of the carriers to enable the read and write transducers to operate in the well-known "cylinder mode". Cylinder mode operation allows reading and writing on a data track on data surface 11 to be immediately followed by reading or writing on the corresponding data track (i.e., the data track in the same cylinder) on data surface 12 with little or no repositioning of the actuator.

One of the problems with the prior art dual-element head shown in FIG. 2 is that the head must be fabricated so that the center line of the sensing ends of the read and write transducers are slightly offset laterally from one another in a direction parallel to the length of the sensing ends that face the disk. This is because the sensing ends are located on top of one another (e.g., gap 44 on top of MR sensing end 58) instead of being in the same plane. The lateral offset is selected to compensate for the skew of the rotary actuator and thus allows the read and write sensing ends to be precisely located over the same track, typically in the middle of the band of tracks. However, because the bottom carrier on the bottom data surface of the disk must be the mirror image of the top carrier on the top data surface, two separate carriers must be fabricated. This means that two different carriers, with different part numbers, must be manufactured and then tracked through the disk drive assembly process to assure their assembly on the proper suspension and actuator arm.

Preferred Embodiments

Figure 3:
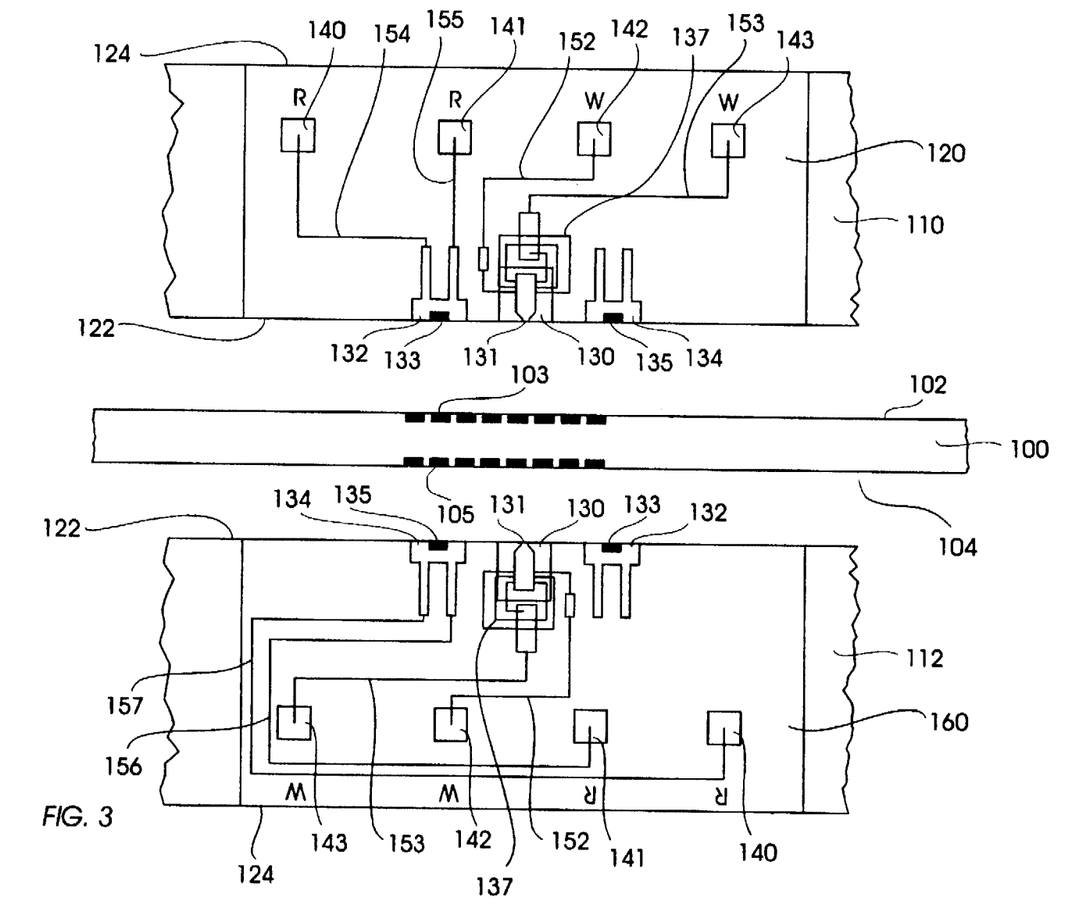
FIG. 3 is an illustration of the present invention of top and bottom head carriers with a common pattern of components, and each with a three-element read/write/read head, depicted in air-bearing relationship with respective top and bottom data surfaces of a magnetic recording disk.

Referring to FIG. 3, there is depicted a magnetic recording disk 100 having a top data surface 102 and a bottom data surface 104, and top and bottom head carriers 110, 112, respectively, on their air-bearing relationship with respective data surfaces 102, 104. The disk 100 and top and bottom carriers 110, 112 correspond to the disk 10 and top and bottom carriers 13, 17 depicted in the disk drive system of FIG. 1. The data surface 102 of disk 100 is shown with a plurality of schematically-represented data tracks, such as typical data track 103 shown in an end view. Each of the data tracks on top surface 102 has a corresponding data track on the bottom surface 104, such as data track 105 corresponding to data track 103. The data tracks 103 and 105 are aligned in substantially the same "cylinder" centered about the center of disk 110 to enable reading and writing of data consecutively on data tracks 103 and 105 in the conventional cylinder mode.

The top head carrier 110 has a trailing surface or end 120. Trailing end 120 of top carrier 110 has a disk side edge 122 that faces disk 100 and is located near the disk side or air-bearing surface side of the disk 110, and a back edge 124 is located near the back side. The trailing end 120 of top carrier 110 has a pattern of components formed on it that include a first element or transducer 130, a second element or transducer 132, and a third element or transducer 134. In the preferred embodiment shown in FIG. 3, the first transducer is a conventional inductive coil write element having a coil 137 and sensing end 131 in the form of a gap that faces the data surface 102 of disk 100. The second and third transducers 132, 134 are generally equally spaced from the center of write transducer 130 and comprise conventional magnetoresistive (MR) read elements. The second transducer 132 is an MR read element having a sensing end 133 that faces the data surface 102, and the third transducer is an MR read element having a sensing end 135 that faces data surface 102. The pattern of components on trailing end 120 also includes a plurality of terminal pads 140–143 and electrical conductors 152, 153 that interconnect two of the terminal pads 142, 143 with the coil 137 of write transducer 130. The two terminal pads 142, 143 thus form a first set of the total plurality of pads 140–143, and the remaining terminal pads 140, 141 form a second set of the plurality of terminal pads. The write transducer 130, the read transducers 132, 134, the terminal pads 140–143, and the electrical conductors 152, 153 together form a pattern of components on the trailing end 120 of carrier 110, and are formed in the conventional well-known manner for fabricating inductive thin film write elements and magnetoresistive read elements. The methods of depositing the specific films to form the read and the write elements and pads are not part of the present invention.

As thus described, the top carrier 110 supports a three-element read/write/read head wherein the three elements are formed in a side-by-side relationship with the two read elements 132, 134 spaced a substantial distance from write element 130 so that the carrier 110 has to be repositioned if data is to be read from a data track immediately after the data has been written to that data track. This spacing distance is approximately in the range of 10 to 100 microns. It should be apparent that this structure is thus different from the conventional dual-element head where the read and write elements are formed on top of one another so that they are aligned with the same data track, essentially as shown in FIG. 2.

Referring now to bottom carrier 112, the carrier 112 has a trailing end 160 with a pattern of components identical to the previously-described pattern of components of the trailing end 120 of top carrier 110. The only difference between the trailing end 120 and trailing end 160 is in the electrical conductors connecting the specific MR read element, i.e., either second transducer 132 or third transducer 134. In the top carrier 110, electrical conductors 154, 155 interconnect terminal pads 140, 141, respectively, with the second transducer 132. However, in the bottom carrier 112, different electrical conductors 156, 157 interconnect terminal pads 140, 141, respectively, with the third transducer 134.

As shown in FIG. 3, the top and bottom carriers 110, 112 are attached to the actuator (not shown) such that the center lines of the sensing ends 131 of the first transducers 130 on both the top and bottom carriers are aligned in the same plane that is perpendicular to both the trailing ends 120, 160 and the data surfaces 102, 104. This alignment allows the data to be written in cylinder mode when the sensing ends 131 of the first transducers 130 are aligned with a data track. Similarly, because the two read transducers are equally spaced from the center of the sensing end 131 of the write transducer 130, the second transducer 132 on top carrier 110 is aligned with the third transducer 134 on bottom carrier 112. Thus, in the preferred embodiment of the present invention, the need for two separate carriers for the top and bottom carriers is eliminated by the use of the three-element read/write/read design, wherein the top and bottom carriers 110, 112 have the identical pattern of components. The top and bottom carriers 110, 112 are personalized by the electrical conductors that wire the appropriate read elements of the three-element set to pads 140, 141. These electrical conductors are formed as the last step in the fabrication process.

Figure 4A:
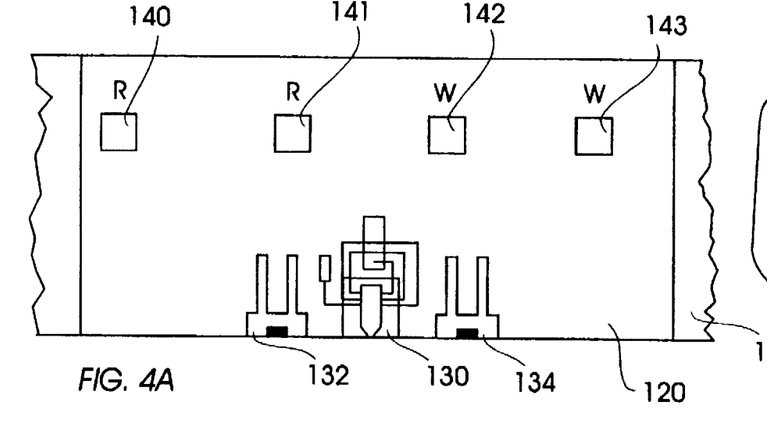
FIG. 4A is an illustration of the trailing end of the common carrier of the present invention with the common pattern of components comprising the three transducers and four terminal pads.
Figure 4B:
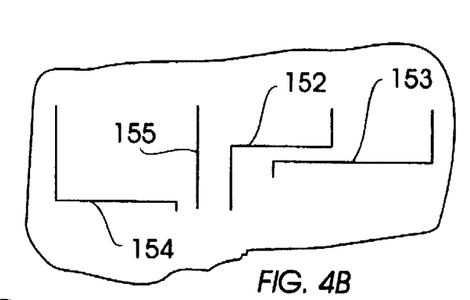
FIG. 4B is a representation of the lithographic mask used to pattern the unique electrical conductor patterns onto the trailing end of the common carrier of FIG. 4A to form a top head carrier.

Referring to FIGS. 4A–4B, there is depicted first in FIG. 4A the common carrier having a pattern of components that includes the central write element 130, the second and third read elements 132, 134, and the four terminal pads 140–143. FIG. 4B is a representation of the personalized lithographic mask used to pattern electrical conductors 152, 153 and 154, 155 onto the common pattern of the trailing end of the carrier depicted in FIG. 4A. When these electrical conductors are patterned, as essentially the last step in the fabrication process of the carrier trailing end, the result is the top carrier 110 with trailing end 120 in which the second read element 132 is electrically connected to pads 140, 141 (FIG. 3).

Figure 5A:
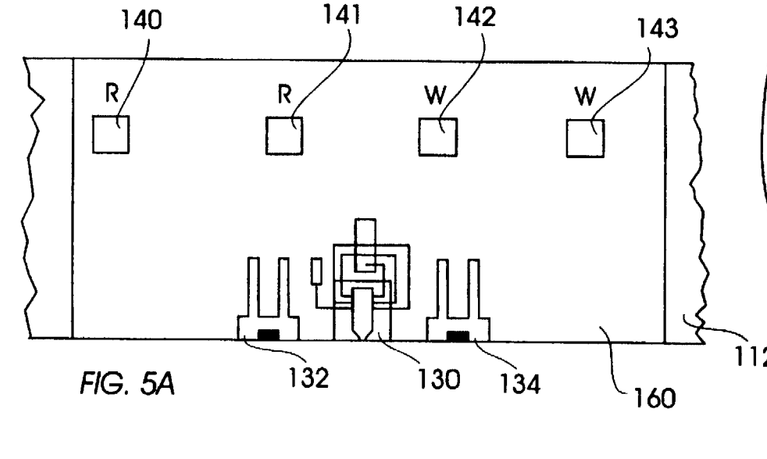
FIG. 5A is identical to FIG. 4A and is an illustration of the trailing end of the common carrier of the present invention with the common pattern of components comprising the three transducers and four terminal pads.
Figure 5B:
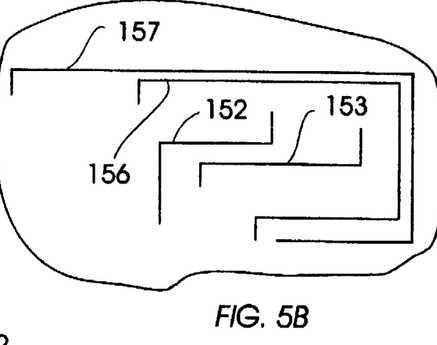
FIG. 5B is a representation of the lithographic mask used to pattern the unique electrical conductor patterns onto the trailing end of the common carrier of FIG. 5A to form a bottom head carrier.

FIG. 5A represents the identical carrier having the identical pattern of components as that shown in FIG. 4A, and FIG. 5B represents the personalized lithographic mask used to pattern electrical conductors 152, 153 and 156, 157 onto the carrier of FIG. 5A. When these electrical conductors are so formed as part of the final personalization process in the fabrication of the carrier, the carrier becomes the bottom carrier 112 with the trig end 160 in which the third read element 134 is electrically connected to pads 140, 141 (FIG. 3).

The personalization masks depicted in FIGS. 4B and 5B could include just the electrical conductors for the respective second and third transducers since the electrical conductors 152, 153 for the first transducer are identical in both cases. In that case, the electrical conductors 152, 153 would form part of the identical pattern of components on both the top and bottom carriers.

Figure 6:
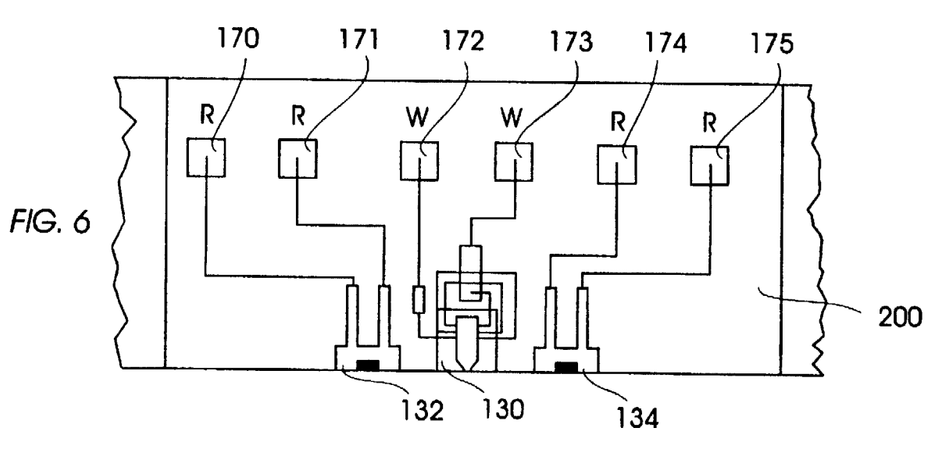
FIG. 6 is a second embodiment of the present invention illustrating a common head carrier with a three-element read/write/read head and six terminal pads that can be used for both top and bottom carriers by uniquely connecting appropriate terminal pads to wiring on the top and bottom suspensions.

Referring now to FIG. 6, there is illustrated a second embodiment of the present invention wherein a trailing end 200 of a common carrier includes six electrical terminal pads 170–175, with each of the three transducers being wired to two separate pads. In this embodiment, the trailing end 200 of the carrier has an identical pattern of components for both the top and bottom carriers. That pattern includes the three transducers, the six pads, and all of the electrical connectors. This provides the advantage that the entire fabrication process is identical for both top and bottom carriers, and the finished carrier can be used for both top and bottom carriers so that there is no need for a personalization process. During assembly of the top and bottom carriers into the disk drive, only the desired read element is electrically connected to the wiring on the suspension, with the other read element left unconnected. Thus, when the carrier of FIG. 6 is used as the top carrier, terminal pads 170, 171 are electrically connected to the appropriate two electrical leads from the cable on the top suspension (e.g., suspension 15 in FIG. 1), and terminal leads 174, 175 connected to the third transducer 134 are left unconnected. Thus, read element 134 is not used. Similarly, when the same carrier of FIG. 6 is used as the bottom carrier, terminals 174, 175 are electrically connected to the two leads from the cable on the bottom suspension (e.g., suspension 19 in FIG. 1).

Figure 7:
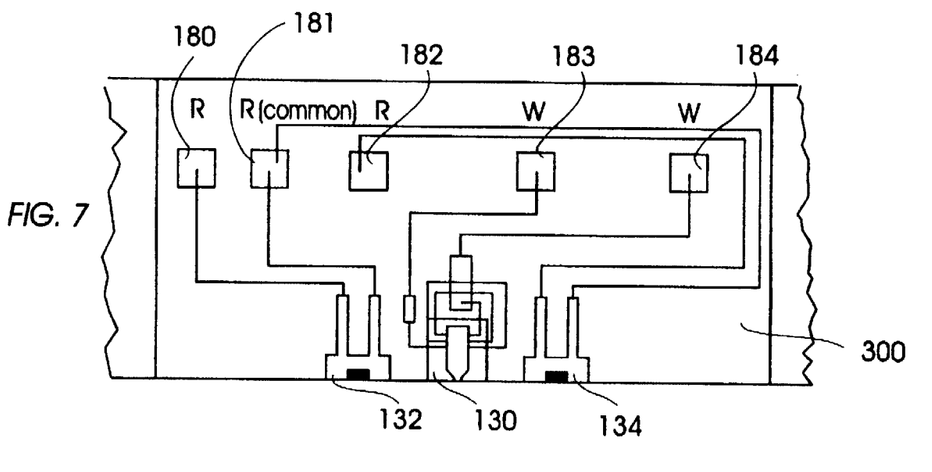
FIG. 7 is a third embodiment of the present invention illustrating a common head carrier with a three-element read/write/read head and five terminal pads, one of which is a common read element pad, that can be used for both top and bottom carriers by uniquely connecting appropriate terminal pads to wiring on the top and bottom suspensions.

Referring now to FIG. 7, there is illustrated a third embodiment of the present invention. In the embodiment of FIG. 7, there is a single common carrier with a trailing end 300 having an identical pattern of components that includes the three transducers, five terminal pads 180–184, and all of the electrical connectors interconnecting the terminal pads with the three transducers. The embodiment of FIG. 7 is similar to that of FIG. 6 with the exception that there are only three terminal pads for the read elements, with one of the terminal pads (i.e., pad 181) being a common terminal pad that is electrically connected to both the second read element 132 and the third read element 134. During assembly of the disk drive, the common carrier, when used as the top carrier, has terminal pads 180, 181 electrically connected to the leads on the top suspension. When used as the bottom carrier, the common carrier has terminal leads 181, 182 electrically connected to the leads on the bottom suspension. Thus, in the manner similar to that of FIG. 6, only one carrier common to both top and bottom sides of the disk need be manufactured. The uniqueness of the top and bottom carriers is obtained by the wiring connection of the terminal pads to the leads on the suspensions.

In the preferred embodiments illustrated and described, the common head carrier is a three-element read/write/read structure. However, it is within the scope of the present invention that the three-element structure can be a write/read/write structure wherein the center transducer is a read element and the second and third transducers equally spaced from the center of the read transducer are inductive coil write elements.

Also, in the preferred embodiments, the second and third transducers are generally equally spaced from the center transducer. This is for disk drives designed to operate in cylinder mode. However, even in such drives, the second and third transducers cannot be exactly equally spaced from the center transducer because of manufacturing tolerances. For example, if the nominal spacing is in the range of 10 to 100 microns, there can be differences in spacing of approximately 0.25 to 1 micron due to lithographic alignment tolerances. For disk drives designed to operate in noncylinder mode, the separation distances of the second and third transducers from the center transducer can be different since there is no requirement that the top and bottom heads be aligned with one another. In noncylinder mode disk drives, the criteria for the transducer spacings becomes one of transducer placement. For example, it can be advantageous for write transducers to always be on the OD side of the read transducer for heads on both the top and bottom disk surfaces if a "load/unload" ramp is positioned at the OD of the disk edge because, as the head comes off the load/unload ramp, data can be accessed or read at the same time for either a top or bottom disk surface. This application would require two separate part designs for the top and bottom transducers unless the three-element design (read-write-read) is used. Thus, a transducer design that allows for the write element to lead the read element relative to a disk diameter (OD or ID) for both disk surfaces is advantageous. The three-element design is a single head structure that satisfies this requirement. A noncylinder mode embodiment can be understood by considering FIG. 3 as representing a noncylinder mode disk drive with the spacing between transducer 134 and center transducer 130 being smaller than the spacing between transducer 132 and center transducer 130, and with transducer 134 of top carrier 110 being electrically connected to pads 140, 141.

The common carrier with the three-element read/write/read head as described above provides the advantage that the manufacturing yield of the heads is substantially improved. For example, a process which has a normal yield of 70% for a single read element design could improve to a yield of 95% for a read-write-read design because of the redundancy created by the extra read element. This is because both read transducers can be tested before assembly into the disk drive to determine if either is bad. If one of the read transducers is bad, and the remaining read element is good, then the carrier is flagged as being either a top or bottom carrier, depending on whether the good read transducer is the second or the third transducer. This is a significant improvement over prior art conventional dual-element heads and side-by-side, dual-element heads, both of which use two unique and separate carriers, each of which has only a single read transducer formed on it. In these prior art heads, if the read transducer is bad after fabrication, the entire carrier is rejected.

While the preferred embodiments of the present invention have been illustrated in detail, it should be apparent that modifications and improvements may be made to the invention without departing from the spirit and scope of the invention as described in the following claims.

What is claimed is:

1. A data recording disk drive of the type having a disk with top and bottom data surfaces, and top and bottom transducer carriers maintained near their associated disk data surfaces for reading and writing on the data surfaces, the disk drive comprising:

at least one data disk having top and bottom data surfaces;

a motor connected to the disk for rotating the disk;

a top carrier maintained near the top surface of the disk for supporting read and write transducers, the top carrier having a back side, a disk side, and a trailing end, the trailing end having an edge near the disk side and an opposite edge near the back side, the trailing end of the top carrier having formed on it a pattern of components comprising (a) a first transducer having a sensing end oriented toward the disk side edge; (b) second and third transducers having sensing ends oriented toward the disk side edge, the second and third transducers being spaced on opposite sides of the first transducer and being read transducers if the first transducer is a write transducer and write transducers if the first transducer is a read transducer; (c) four terminal pads near the back side edge for electrical connection to the transducers; and (d) first and second electrical conductors interconnecting the first transducer with the first and second terminal pads;

a bottom carrier maintained near the bottom surface of the disk for supporting read and write transducers, the bottom carrier having a back side, a disk side, and a trailing end, the trailing end having an edge near the disk side and an opposite edge near the back side, the trailing end of the bottom carrier having formed on it a pattern of components identical to said pattern of components formed on the trailing end of the top carrier;

third and fourth electrical conductors located on the trailing end of the top carrier and interconnecting the second transducer on the top carrier with the third and fourth terminal pads on the trailing end of the top carrier;

fifth and sixth electrical conductors located on the trailing end of the bottom carrier and interconnecting the third transducer on the bottom carrier with the third and fourth terminal pads on the trailing end of the bottom carrier; and an actuator connected to the top and bottom carriers for simultaneously moving the top carrier across the top surface of the disk and the bottom carrier across the bottom surface of the disk so the transducers may access data on their associated data surfaces.

2. The disk drive according to claim 1 wherein the first transducer is an inductive write transducer, and the second and third transducers are magnetoresistive read transducers.

3. The disk drive according to claim 1 wherein the second and third transducers on said identical carriers are generally equally spaced on opposite sides of the first transducer; and wherein the top and bottom carriers are connected to the actuator such that the center of the sensing ends of the first transducers on the top and bottom carriers lie in a first plane generally perpendicular to the data surfaces and the trailing ends of the carriers, and the sensing end of the second transducer on the top carrier and the sensing end of the third transducer on the bottom carrier lie in a second plane generally perpendicular to the data surfaces and the trailing ends of the carriers, whereby data can be read from and written to the data surfaces in cylinder mode using top and bottom carriers with identical patterns of said components on their trailing ends.

* * * * *